June 4, 1929.  B. J. GOLDSMITH ET AL  1,716,044
WINDOW
Filed March 24, 1925   2 Sheets-Sheet 2
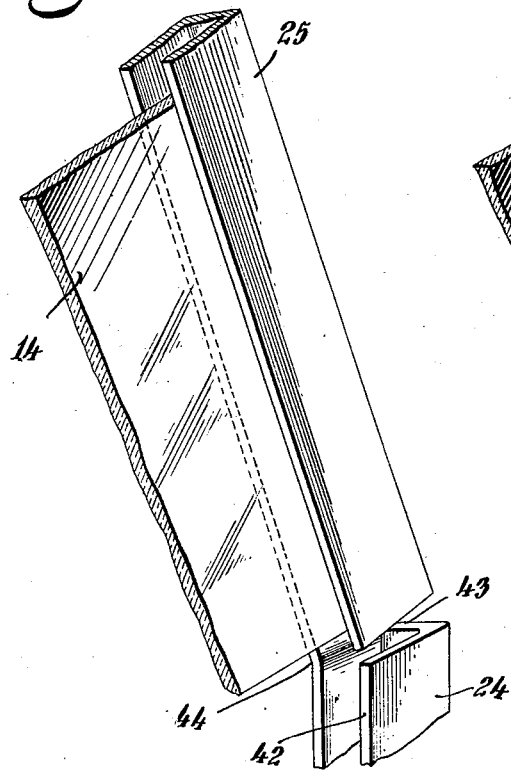
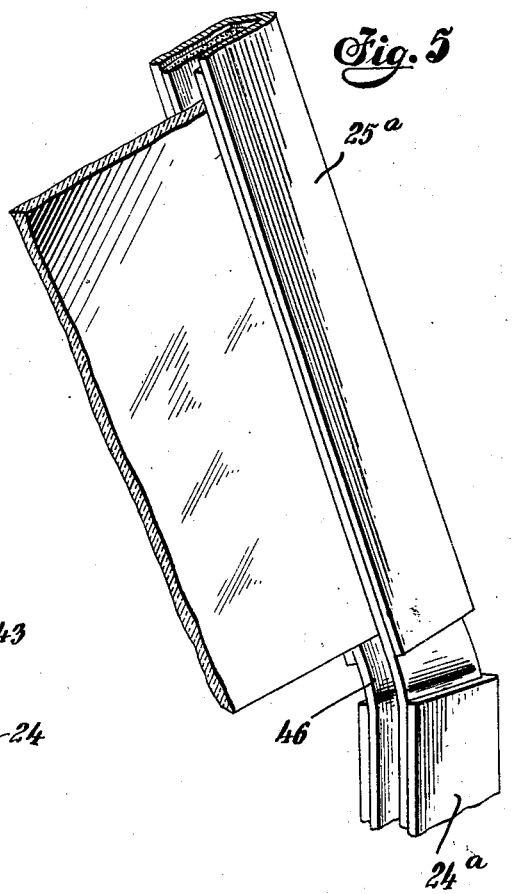
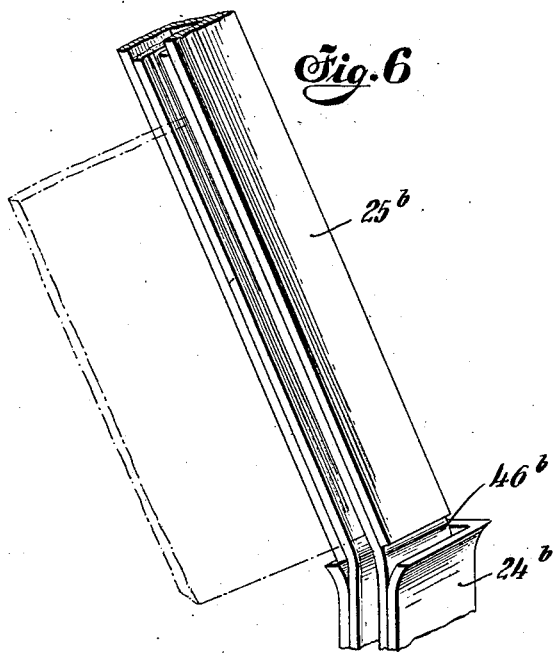
INVENTOR
Bertram J. Goldsmith
Emil Koeb
BY
Townsend + Decker
ATTORNEYS Patented June 4, 1929.

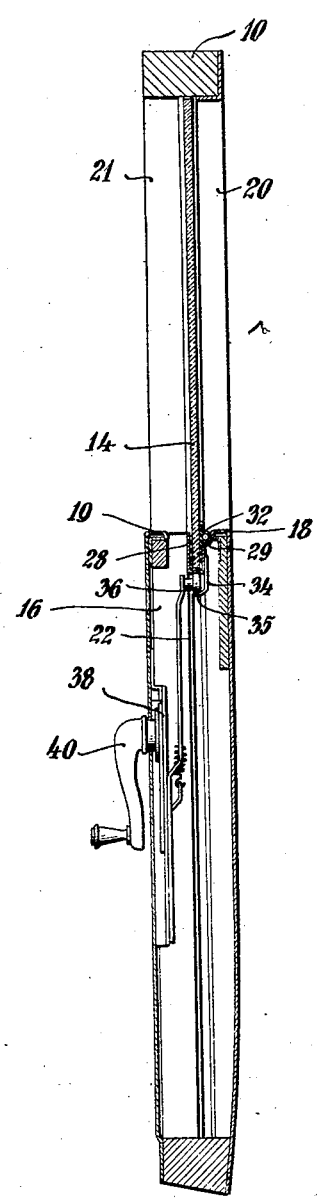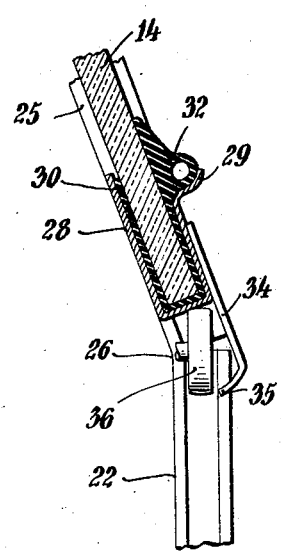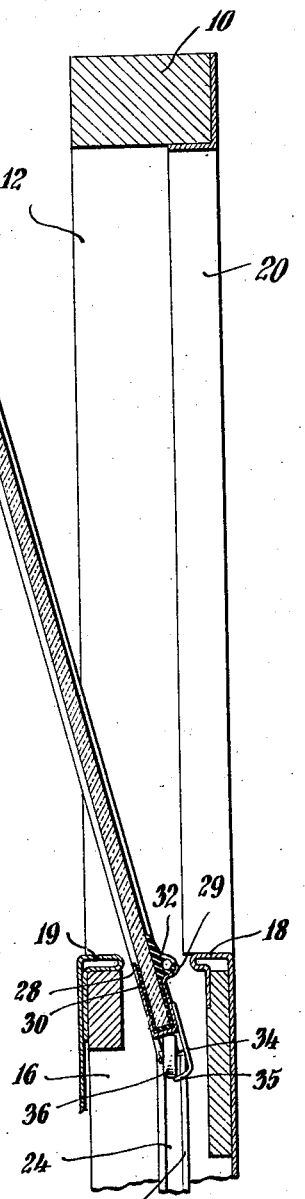

1,716,044

UNITED STATES PATENT OFFICE.

BERTRAM J. GOLDSMITH, OF NEW YORK, AND EMIL KOEB, OF TUCKAHOE, NEW YORK, ASSIGNORS, BY MESNE ASSIGNMENTS, TO THE ENGLISH & MERSICK COMPANY, OF NEW HAVEN, CONNECTICUT, A CORPORATION OF CONNECTICUT.

WINDOW.

Application filed March 24, 1925. Serial No. 17,914.

This invention relates to improvements in windows and the method of assembling the same in position on the window frame.

It is a primary object of the invention to so arrange the supporting and operating structure of a movable window that the window can be inserted in position with an economy of time and labor and which, when installed, can be operated silently and efficiently and which will be properly sealed with respect to the window frame.

Other and more specific objects will appear as the description proceeds.

Referring to the drawings wherein there are shown certain specific embodiments of our invention:

Fig. 1 is a vertical section through a body part or frame member with the window in closed position.

Fig. 2 is a similar section on an enlarged scale of the upper portion of the structure shown in Fig. 1 and illustrating the method of assembling the window in its supporting frame.

Fig. 3 is a similar section of a detail shown in Fig. 2 and on a larger scale.

Fig. 4 is a perspective view of the window guide shown in Figs. 1 to 3.

Fig. 5 is a similar view of a modification thereof.

Fig. 6 is a similar view of a second modification thereof.

Referring to the details of the drawings we have shown at 10 a portion of a frame member which may be either a door or a main body part as the invention is adapted for use with any form of supporting structure or frame. The frame member 10 is provided with an opening 12 adapted to be closed by the closure 14 shown as a section of plate glass as is usual in automobile constructions. The body frame 10 has a window well 16 into which the window can be moved so as to leave the opening 12 unobstructed. The window well 16 is protected at the upper or open side thereof by means of the outer and inner window sills 18 and 19. These sills may be formed as continuations of the metallic body parts or reinforcements of the door as shown in Figs. 1 and 2. The opening 12 has formed therearound the securing and reinforcing strip 20 which likewise may be formed as a continuation of the main body of the door if desired. Moulding strips 21 are mounted on the inner faces of the side members of the body member 10 in position to hold the guiding channels 22 in position on the body member.

The channel members 22 open inwardly and are arranged to support and guide the window 14 during its movement in the frame. The channels are constructed with a lower permanently secured section 24 and an upper removable section 25 so arranged that the upper section may be drawn out of alignment with the bottom section 24 for the purpose of permitting the insertion of the window pane 14 therein as shown in Figs. 2 to 6. The point 26 at which the upper section 25 bends with respect to the lower section is near the top of the window well 16 and is therefore substantially at the lowermost portion of the window pane 14 when the latter is in raised position for a purpose to be hereinafter referred to.

The bottom of the window element 14 carries a U-shaped channel member 28 clamped thereon, the member 28 having an outwardly extending supporting flange 29. A suitable shock absorbing strip 30 is preferably arranged between the window element 14 and channel 28, the member 30 having formed upon one side thereof adjacent the outer face of the window an outwardly projecting rib 32 supported by the flange 29 of the channel member 28. The rib 32 forms with the outer sill 18 a tight seal between the window pane and door frame when the window is in closed position. The supporting channel 28 carries a downwardly and inwardly projecting plate 34 having a flanged portion 35 forming a channel guide, receiving the roller 36 of the window operator.

The window operator 38 may be of any preferred form the details thereof forming no part of our present invention. It is to be understood that upon rotation of the operating handle 40 the roller 36 which is mounted on the end of an arm, as shown, operatively connected to said handle and partially horizontally within the channel guide just described below the U-shaped channel 28 is caused to move vertically and since it engages beneath the bottom of the channel member 28 and above the flange 35 vertical movement thereof causes a vertical movement of the window 14 in an obvious manner.

The details of the flexible joint between the movable and fixed sections of the guide members 22 shown in Figs. 1, 2 and 3 are shown in detail in Fig. 4. According to this form of the invention the outer flange 42 and base 43 of the channel 22 are severed so that the upper section 25 thereof can be bent about the remaining flange 44 into the position shown in Figs. 2, 3 and 4.

The form of the invention shown in Fig. 5 differs from the above described construction in that the upper section 25A of the channel is formed as an entirely separate section from the lower portion 24A thereof, the upper and lower section of the channel being joined only by means of the packing strip 46 which engages within the channels to protect the window 14 in its movements. When the window has been inserted in the upper channel 25A and this channel has been moved to its vertical position as in Fig. 1 the lower end of section 25A abuts against the upper end of the section 24A to form substantially one continuous guide.

The form of the invention shown in Fig. 6 differs from that shown in Fig. 5 in that the ends of the channels 25B and 24B telescope slightly in order to form a more substantial guide for the window and in which the channels will be held rigidly in vertical alignment. This is accomplished by having the upper end of the channel 24B flared sufficiently to allow the channel 25B to pass into the end thereof a certain distance. In this form of the invention also it is preferred to have the guiding channels lined with a shock absorbing strip 46B in order to protect the window and to prevent rattling thereof.

The assembling and operation of a window structure formed according to this invention are as follows. During the construction of the frame part 10 the lower section 24 of the guide is permanently secured in place on the sides of the window well. The upper sections 25 of the guides are then turned to the position shown in Fig. 2. In this position of the channels the window element 14 can be inserted to substantially the position it would take when in closed position. Since the flange 35 on the lower edge of the window is supported only upon the outer side thereof the operating roller 36 may then be brought into the position shown in Fig. 3 so that upon a movement of the upper sections 25 of channels 22 into the normal operative position as shown in Fig. 1, the flange 35 engages beneath the roller 36. The removable strips 21 are then secured in place against the channel 25 and the window is ready for use. The sealing strip 32 in this position engages with the outer window sill 38 to form therewith a tight joint as in Fig. 1.

While we have shown and described certain specific embodiments of our invention it is understood that they are merely illustrative and that we are limited only as set forth in the appended claims.

We claim as our invention:

1. In a window mounting, a frame, a movable window and means for movably and removably mounting said window in position in said frame, said means including guide members secured upon the sides of said frame in position to receive said window, said guide members being substantially rigid for the main portion of the length thereof but having formed therein a flexible section whereby a portion of the length of each guide member may be inclined with respect to the other portion thereof.

2. The method of installing a window in its guiding frame and securing the same to a window operator comprising bending a section of said frame outwardly, attaching a flanged track to an edge of said window, inserting said window in said bent section to a position wherein said window engages said window operator, and rebending said window frame so that the sections thereof are substantially aligned, with the flange of said track engaging said window operator.

3. In a window construction including a frame and a slidable closure, guideways in said frame supporting said closure, said guideways providing supporting contact with the sliding edges of said closure and adapted to be bent at a point between their extreme edges for tilting of said closure with respect to said frame.

Signed at New York in the county of New York and State of New York this 23rd day of March A. D. 1925.

EMIL KOEB.
BERTRAM J. GOLDSMITH.